Figure 5:
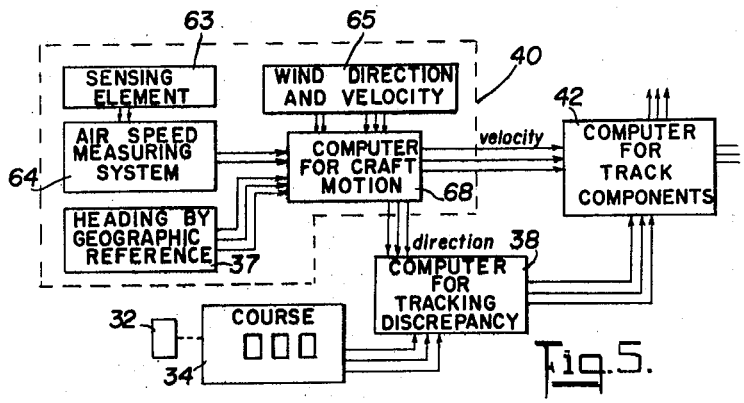

Jan. 14, 1964    R. E. VAGO    3,118,059
APPARATUS FOR COMPUTING AIRCRAFT POSITION
WITH RESPECT TO FLIGHT TRACKS
Filed Dec. 28, 1959    3 Sheets-Sheet 1
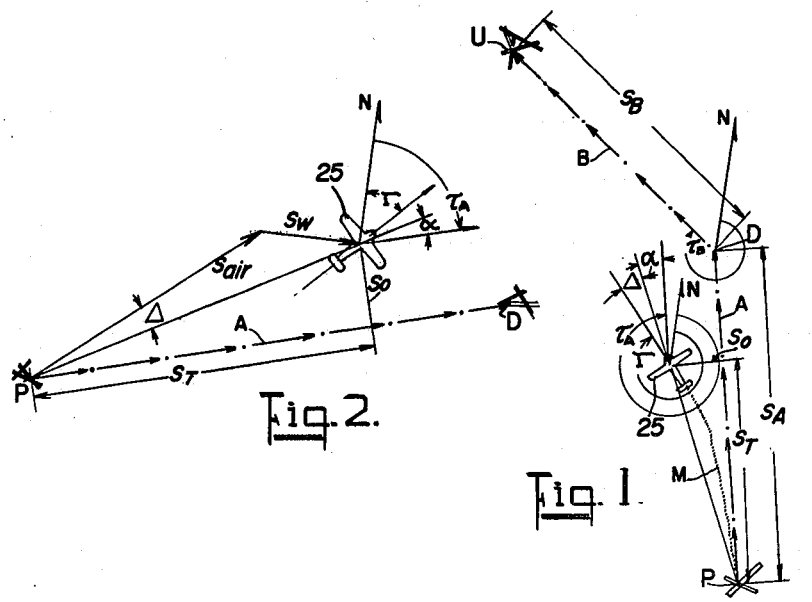
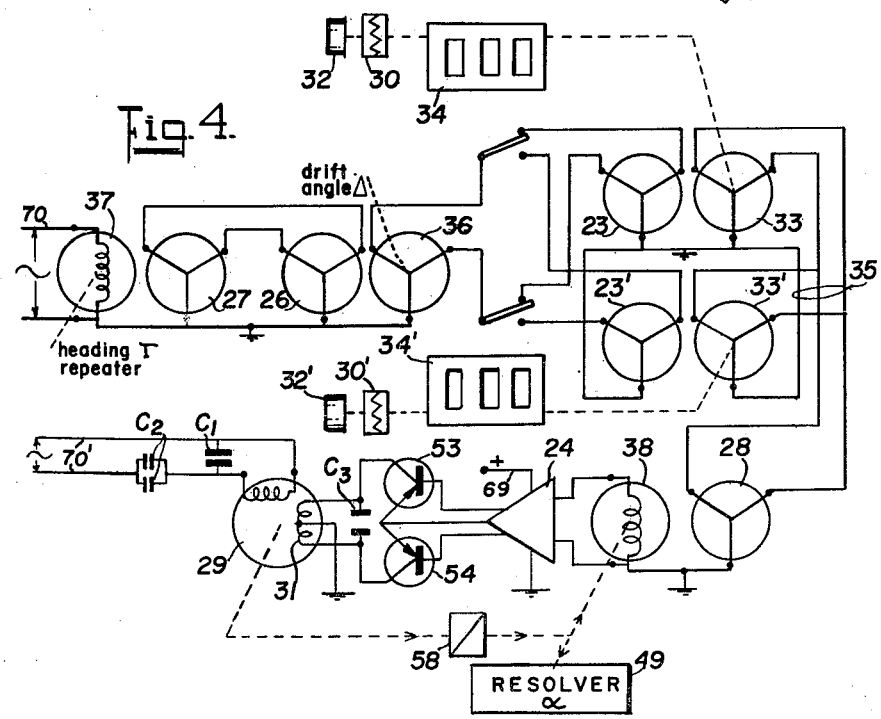
INVENTOR
*ROBERT EDWARD VAGO*
by R. J. Filipkowski
AGENT

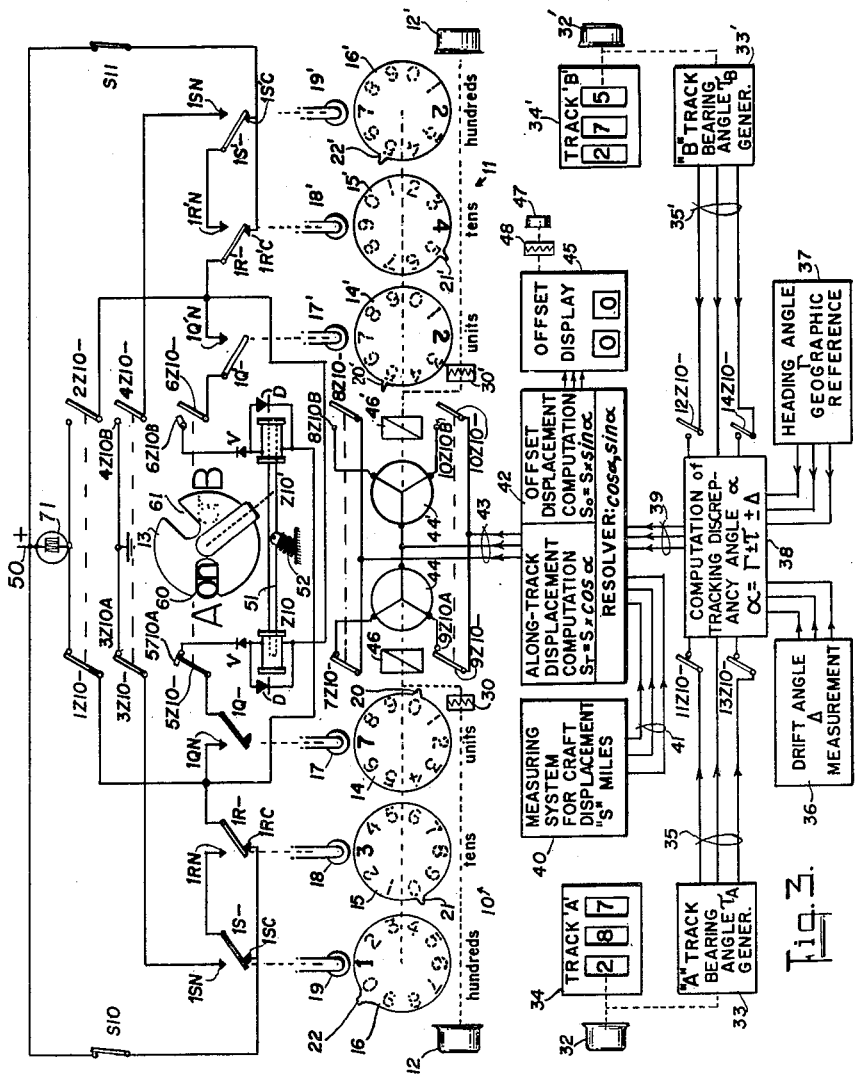

Jan. 14, 1964

R. E. VAGO 3,118,059

APPARATUS FOR COMPUTING AIRCRAFT POSITION
WITH RESPECT TO FLIGHT TRACKS

Filed Dec. 28, 1959

3 Sheets-Sheet 3

INVENTOR
ROBERT EDWARD
VAGO
by R. J. Filipkowski
AGENT

United States Patent Office 3,118,059
Patented Jan. 14, 1964

3,118,059
APPARATUS FOR COMPUTING AIRCRAFT POSITION WITH RESPECT TO FLIGHT TRACKS
Robert Edward Vago, Ottawa, Ontario, Canada, assignor to Computing Devices of Canada Limited, Ottawa, Ontario, Canada
Filed Dec. 28, 1959, Ser. No. 862,109
7 Claims. (Cl. 235—187)

This invention relates to navigational computing and position indicating apparatus, and more particularly concerns apparatus for computing ground track of an aircraft and display of information representing craft position relative to a chosen destination.

For the guidance of aircraft flying between geographic positions it is customary to provide navigational aids in the form of radio beams or beacons to determine a sectoral zone or "track" in space along which the craft may be steered. Such guidance means do not however provide any quantitative information as to the distance by which a craft has moved laterally of the beam, and moreover no information is provided as to distance travelled relatively to ground. In the case that the radio beacon fails or operates incorrectly the aircraft is unable to rely on the aid. Moreover, in transoceanic flights where flight legs of several hundreds of miles are flown, self-contained guidance means of low weight and independent of remote transmitting stations is highly desirable.

The present invention has therefore as its main purpose the provision of apparatus which does not rely on information transmitted from a ground position or positions, and which computes and displays in simple form both the distance remaining to a destination and the lateral offset distance of the craft with respect to a given track to be followed to reach the destination, the computation being performed with information furnished by ancillary equipment carried by the craft supplying actual ground speed and direction. By the use of the invention, the aircraft is enabled to move freely laterally with respect to a chosen track leading to a geographic position.

Essentially the invention consists in a configuration of apparatus for storing an inserted angular quantity representing the bearing with respect to a geographic position of a first reference position, apparatus for storing inserted information of the distance separating the two positions on a totalising register, ancillary apparatus for determining the craft heading angle with respect to geographic reference direction and for determining craft velocity and direction relatively to ground, computing apparatus to which the difference between the bearing angle and the actual direction of motion, as well as ground speed, are applied as inputs for computing therefrom the components of ground speed along the desired track and at right angles thereto, and means for continuously adding to the totalising register the along-track distance traversed to produce an indication thereon of mile remaining to the reference point, while also displaying on a further register continuously the net offset distance from the track and its relative sense left or right; there being also provided a second set of information storing apparatus for the distance and bearing parameters of a further ground track leading from the first reference position to a second reference position, and the computer including change-over means for automatically effecting a transfer into the apparatus of information of new track bearing, and a transfer of computed along-track component to the second totalising apparatus, when the distance remaining along the track being flown becomes zero In carrying the invention into effect, craft heading is determined by known forms of gyro-magnetic compass or earth inductor compass apparatus and information of the craft speed relative to ground and the true direction of craft motion relative to ground are obtained by ancillary equipment. The latter may take the form either of a craft-borne reflected radio wave ranging system of the Doppler type, or, alternatively the information may be established by a dead-reckoning system of the type wherein a resultant vector is produced by vectorial summation of a first vector designating measured craft velocity relative to the air mass (true air speed) and a second vector representing the wind, i.e., air mass motion relative to ground. With either system the determination of tracking discrepancy, that is to say, the angular error between the actual direction of craft motion and the stored bearing of a selected destination may be directly made by angle summing means such as differential synchro devices, whereupon the components of craft motion along the track and at right angles to the track are found by multiplying the ground speed respectively by the cosine and the sine of the discrepancy angle, with due regard to positive or negative sign of the trigonometric function The offset distance is displayed as distance left of track when the draft moves away to the left, and vice versa, while the along-track output computed by the computer is fed to the distance totalising register in such sense as to diminish the indicated distance to destination while the craft is moving towards it, and to augment the indicated distance while moving away from it.

Since the typical flight plan of an aircraft requires that it proceed along assigned lanes between consecutive geographically spaced ground check points not lying along a straight line, the navigation of aircraft requires periodic estimation of proximity to a check point, awaiting confirmation of the arrival of the craft over the point, and then setting in the new course direction for autopilot guidance to the next point. There is an interval in which guidance lapses while passing over the check point before coming into the beacon for the next leg of the flight.

The provision of apparatus according to the present invention largely simplifies the operational procedures and removes the uncertainty of present position as when using the overlapping beam types of radio beacon and upward cone markers, and permits each subsequent course bearing and distance to be set in well in advance of approach to the point at which course changes. Information of both the proximity of such course change point and of craft position relative thereto is instantly apparent and comprehensible to a navigator, while automatic transfer means automatically adjusts the data handling elements to compute and display position relative to a new track immediately a current track has been traversed.

Figure 6:
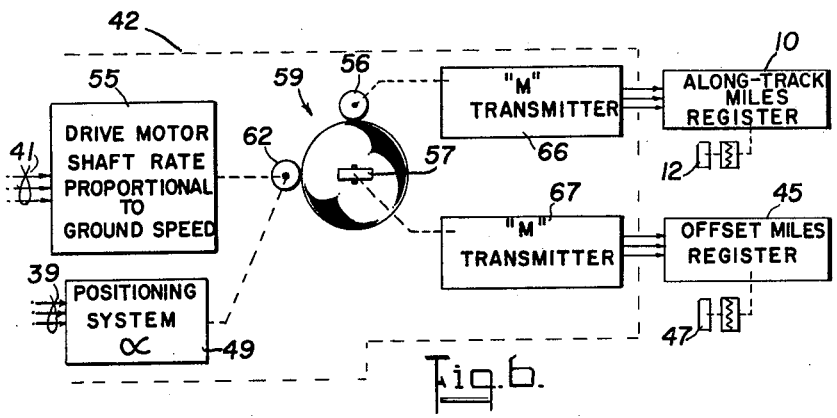

The foregoing stated provisions and purpose are described more particularly in the following description of preferred embodiments of the invention, and by the accompanying figures of the drawing, which comprise:

FIGURE 1, which is a map plan representation (not to scale) of an aircraft relative to a pair of ground tracks and showing certain parameters useful for the explanation of position computations;

FIGURE 2, which is a map plan similar to FIGURE 1 showing data required for the computation of position from air speed and wind information;

FIGURE 3, being a schematic circuit and functional diagram of a complete navigational computing system according to the invention, having totalising registers and course bearing registers for each of two consecutive ground tracks to be followed;

FIGURE 4, a circuit schematic diagram of an angle combining group of devices forming part of the system of FIGURE 3;

FIGURE 5, a functional block diagram of ancillary apparatus for derivation of ground speed components from a measurement of true air speed and wind data; and, FIGURE 6, a diagram wherein electromechanical computing elements derive track components and operate totalising registers.

Referring to the drawing, an aircraft designated 25 is shown in FIGURE 1 to be proceeding from an initial point P, towards a fixed point D lying a distance $S_A$ from P, along a course whose bearing makes the angle $\tau_A$ referred to North, as determined by magnetic or geographic longitude meridian. The craft measures a heading angle $\gamma$ with the meridian, and moves in its heading direction while also having a drift component of motion not aligned with the heading, whereby the resultant craft motion is in a direction making the angle $\Delta$ with the heading. Consequently the tracking discrepancy in these circumstances is the angle $\alpha$. Information of the ground speed and direction is understood to be obtained continuously by craft-borne measuring equipment of adequate precision such as a Doppler radar or inertial platform system. The craft has moved along any arbitrary track, such as M, to its present position, a distance $S_T$ from P, and is offset by the distance $S_0$ from the straight line track between P and D, shown by the dot and arrow line "A." The distances $S_T$ and $S_0$ may be shown to be respectively the product of ground displacement multiplied by the cosine and the sine of the discrepancy angle $\alpha$.

It will be seen that a display of the two components, if presented continuously to a pilot of the aircraft, enables him to correct his position and to arrive over the point D with no offset distance remaining; once the craft has reached point D it immediately becomes necessary to substitute a new bearing $\tau_B$ for continuing flight along track "B", a further distance $S_B$.

For automatic computation of present position by reference to the parameters hereinbefore discussed, the primary inputs to a computing and distance integrating means include measured velocity of the craft relative to ground and the relative angular difference between the desired track and the actual direction of motion. The information of the angular quantities $\tau$ and $\gamma$ requires to be based on the geographic reference, which may be the local magnetic meridian, or a north-seeking element of a gyro system. Apparatus for summing the angles to derive the tracking discrepancy angle $\alpha$ will be more particularly described in connection with FIGURE 4.

In the navigation of aircraft throughout regions for which accurate wind data at flight altitudes throughout a given leg is available, particularly where the elapsed flight time between check points will be short, it is entirely practical to derive information of the ground speed and direction from air speed and wind data, known either at the commencement of the flight or learned while in flight. Referring to FIGURE 2, an aircraft 25 proceeding from point P toward D which lies distant therefrom $S_A$ miles along bearing $\tau_A$, is shown moving with a heading $\gamma$ and is offset northerly of the track between points P and D by a distance $S_0$ miles. The true ground speed is the resultant of the vectors "$S_{air}$", representing craft motion relative to the air mass along its heading $\gamma$ at a certain air speed, and the vector $S_W$, which is the wind drift experienced over the same time interval. The along-track component of its present position is $S_T$ miles from P, and may be computed as the product of craft distance from point P, multiplied by the cosine of the angle $\alpha$, which is the tracking discrepancy angle.

Referring now to FIGURE 3, an embodiment of the invention is shown to consist in the apparatus designated in part by functional block outlines bearing legends, and partly by interconnected schematic circuits associated therewith. A pair of totalising registers respectively designated 10 and 11 each having a capacity of 999 miles, of the repeating type, are manually re-settable by means of their individual adjustment knobs 12, 12' coupled by means of slip clutches 30, 30' with input drive elements to the registers to turn dials 14, 15, 16, and 14', 15', 16'. It will be well understood that totalising registers for numerical storage and display by units, tens and hundreds decade orders, wherein the members representing the several orders are linked mechanically as by Geneva or other counting mechanism movements, may be realized in various configurations such as drum-faced, disc-faced, or cone-faced bodies. Accordingly it will be understood that input suitably applied to operate the units indicator 14 will cause, once per revolution of the indicator, a "carry" action to advance the tens indicator 15 by one integer. Similarly, for one full revolution of the tens indicator the hundreds indicator 16 will be advanced one integer.

The foregoing and following discussion applies similarly to the register 11, which is formed identical in all respects with the register 10, the relative positions of the units, tens and hundreds indicators of register 11 having been reversed for the sake of facilitating circuit description, and like parts being designated by the same reference numerals as used for register 10, except that primes (') are added.

When units indicator 14 displays a zero (0), a cam projection 20 carried thereby elevates a push rod 17, to throw the pole 1Q— of a switch device, to close on its normally open contact 1QN. Similarly, as each of the tens and hundreds indicators display a zero, their respective cam projections 21 and 22 actuate further push rods, respectively 18 and 19, to throw the poles 1R— and 1S—. When the register displays no stored distance quantity, i.e., when the reading is "0—0—0", a path may be traced through 1Q—, 1QN, 1R—, 1RN, 1S—, 1SN, thence to ground via 3Z10— and 3Z10A. In these circumstances no path leads through the switching system from supply lead 50 by way of either of the normally closed contacts 1SC or 1RC as long as poles 1S— and 1R— remain thrown.

Associated with the registers 10 and 11 are a pair of solenoids Z10 and Z10', having separate windings, and a common armature 51 reciprocable so that as one end thereof moves into solenoid Z10 the other end is withdrawn from Z10'. A manual switching element and display selector 13 is coupled with the armature, and is actuated for limited angular rotation between a pair of limit positions by the movement of the armature, a slot or opening 60 thereof registering with the indicia "A On" carried by the frame, when the selector is in the illustrated position. The two stable limit positions are determined by the coaction with the armature of a frame-supported toggling spring 52. It will be understood that other equivalent means for holding the mechanism in rest positions may be substituted.

Also associated with the armature 51 are the group of switch arms or poles designated 1Z10—, 2Z10— . . . 14Z10—, inclusive, the odd-numbered series 1Z10—, 3Z10— . . . 13Z10— being shown closed on their respective single contacts such as 3Z10A, 5Z10A, while the contacts such as 4Z10B, 6Z10B associated with all even-numbered poles 2Z10—, 4Z10— . . . 14Z10— are open.

When register 10 is cleared to provide a zero indication the terminal of the winding of solenoid Z10 connected to contact 5Z10A will be grounded, and the other winding terminal, which is connected to the pole 1R'— of the switching elements in register 11, will have positive supply from lead 50 applied thereto by way of contact 1R'C. Current flow in the winding will pull armature 51 to the left, against the force of toggle spring 52, to break all connections between the odd-numbered poles and their contacts, while closing the even numbered poles on their contacts. It will be seen that the current path through the winding of Z10 includes the contact 5Z10A, which is arranged to hold electrical connection with pole 5Z10 until the toggling spring bias has been overcome so that momentum can complete the throw. This may be effected by forming the contact as a resilient body having a limited following travel with the pole before clearance is made, or as a segment of such arcuate length that a wiper carried by the pole holds the electrical connection for a sufficient length of time.

Each solenoid winding is shunted by its associated diode D poled in a direction opposite to the voltage drop across the winding when energized, for spark suppression purposes, and is energized by current of correct polarity applied by way of series diode V.

When the transfer mechanism operates by solenoid energization, manual knob 13 is turned to display the warning "On" B," indicating that the apparatus is connected to compute with respect to track information stored previously in register 11. The latter is thereupon operated by drive from a reducing transmission 46', which transfers rotary motion from the shaft of a stepping motor 44' in either direction, i.e. either to increase or decrease the quantity indicated by the register. The displacement of the motor shaft is arranged to be proportional to the along-track component of distance the craft moves relative to ground, which component is fed as electrical pulses carried by the conductor group 43 to the motor by way of the switch paths 8Z10B, 8Z10—, and 10Z10B, 10Z10—.

The electrical pulses carried on conductors 43 correspond to angular positions of a telemetering switching element usually termed an "M-transmitter," the latter preferably being chosen to have highly precise angular intervals and low input torque requirement. The computational apparatus forming part of the block designated 42, for producing the along-track displacement output is more particularly described in conjunction with FIGURE 6, and has the functional purpose of producing the quantity $S_T$ as the summation with time of the product of ground speed and the cosine function of the tracking discrepancy angle $\alpha$. The computer equipment 42 also produces an output computed as offset distance $S_0$, as the summation with time of the product of ground speed multiplied by the sine of the angle $\alpha$, this output being fed similarly to an offset distance totalising register 45. A manual resetting knob 47 is linked with the input to register 45 by means of slip clutch 48, whereby the indicated quantity may be set to zero or corrected.

Associated with each of registers 10 and 11 are the respective angle registers designated 34 and 34' for setting in course bearings, these quantities representing the bearing $\tau_A$ of a first flight track "A" and the bearing $\tau_B$ of a second flight track "B," both being measured clockwise from the geographic meridian. The manipulation of respective knobs 32 or 32' positions a moveable element of an induction regulator device 33 or 33', specifically a rotor element of such device, commonly called a synchro, between whose output conductors such as 35 there exist cophasal A.C. voltages whose relative magnitudes represent the rotor position with respect to the stator.

A heading angle generator apparatus 37, which is arranged to produce electrical analogue signals corresponding to the angle $\gamma$ made by the fore-and-aft center line of the aircraft with the reference meridian, feeds this signal into an angle summing apparatus generally designated 38, into which corresponding inputs are fed representative of drift angle $\Delta$ and a chosen track angle. The output of apparatus 38, carried by conductor group 39, is the electrical analogue representing computed tracking discrepancy angle $\alpha$.

A ground speed measuring system, designated 40, carried by the craft and effective to determine the actual speed of the craft relative to ground, produces an output over conductors 41, which is fed as input to the computer 42. This input may take the form of signals representing units of distance increment; alternatively, the input may be a magnitude representing a rate, or an actual shaft rotational speed, where the computer 42 is arranged to produce therefrom a distance summation.

The system 40 may be realized as a Doppler radar ranging system, which per se forms no part of the present invention; such system will be understood to provide an output representing instantaneous craft velocity along its true direction of movement, and the magnitude of the angle $\Delta$ made with such direction by the heading of the craft, i.e., drift. For such system, apparatus shown separately as block 36 may form an inherent part of apparatus 40.

Alternatively, the ground speed may be derived by dead reckoning means to be described now with reference to FIGURE 5. The measuring apparatus shown by the outline 40 includes a true air speed measuring system, which employs a sensing element 63 carried by the craft, feeding data to an air speed measuring system 64, for producing an electric analogue output signal representing the numerical magnitude of velocity, or a count of miles displacement. The rate or distance quantity is fed to a computer 68, together with the heading direction, for example in their polar co-ordinates, while a separate system 65 generating corresponding vector data of wind velocity or displacement, and direction of air mass motion feeds the wind quantity also as polar co-ordinates to the computer. The latter may comprise any suitable form of vector addition apparatus for handling vectors represented by electrical analogues in Cartesian or polar co-ordinate form and producing a resultant vector quantity in polar co-ordinate form. Such apparatus may be described as consisting in means for producing from each of a pair of vector quantities to be added, their orthogonally related components, in electrical analogue form, as for example R.M.S. values of a 400 cycle voltage, which are summed by respective summing amplifiers for each co-ordinate. A two-phase to two-phase resolver having orthogonally related stator windings and like rotor windings, having its stator windings respectively fed from the amplifier outputs has voltages induced in its rotor windings which are fed to error amplifiers; these energize servo positioning devices respectively setting the rotor angle to the resultant vector angle, and setting the magnitude of negative feedback voltages to the summing amplifiers representing the resultant vector's magnitude.

Accordingly, the equivalent outputs of blocks 40 and 36 may be produced to represent the resultant vector as shown in FIGURE 2, which is applied as input to block 42, it being important to note that the drift angle is inherently contained in the output fed to computer 38 for determining tracking discrepancy angle.

In the combination of the angle values in the case where ground motion is determined by Doppler radar means, apparatus is preferably arranged as in FIGURE 4 to carry out the intended function of block 38 for determining tracking discrepancy. In the diagram, a mechanically positioned follower system forming part of a gyrocompass/magnetic compass combination, or an earth inductor compass apparatus (not shown), drives the rotary element 37 of a synchro device, having its windings fed from an A.C. supply of 400 cycles over leads 70, to induce in the windings carried by stator 27, voltages whose magnitudes signify the relative position of rotor to stator. A mechanical input from a drift angle computer (not shown) forming part of a Doppler measuring system of ground speed and direction, positions the rotor 36 of a differential synchro device, the windings of the stator 26 of which are fed from the output of stator 27, thereby to induce in the leads from stator 36 a set of voltages representing the net angle, i.e., addition or subtraction, depending on the sense of the rotations of the rotor elements.

Each of the track angle registers for track "A" and track "B" on which respective course bearing angles are manually inserted, is coupled with the rotors 33 and 33' of differential synchro devices, whose stators 23 or 23' are fed selectably by the resultant voltages from stator 36.

Accordingly, either one of rotors 33 or 33' will have resultant voltages induced in the windings thereof, representing the combination, according to sense of the rotor angles, of angular displacements of moveable elements 36, 37, and 33, to yield a signal delivered by leads 35 to the stator 28 of a synchro receiver. The rotor 38 of this receiver has a single phase voltage induced therein, whose magnitude depends on the angular relationship of the rotor to the resultant field induced in the stator 28 by its windings. Accordingly the rotor may be so positioned that no A.C. voltage is induced in its windings. This voltage is fed as input to an amplifier 24, supplied from positive supply 69, which produces an output signal having a predetermined phase difference with respect to input, and which feeds its output signal antiphasally to the bases of a pair of transistor devices 53, 54. In series with the emitter-collector path of each device there is connected one half of a center-tapped stator winding 31 of motor 29. Currents developed in winding 31 have a phase angle different from that of supply 70, determined in part by the lead angles of the combining system synchro devices, the phase shift of the amplifier, and the output shunt capacitor C3. A separate winding of the motor is fed with current from a derived A.C. supply 70' of a frequency identical with that at 70 and constant phase relationship, as for example by a transformer. A corrective capacitor network comprising series capacity C2 and shunt capacity C1 is provided to adjust the current angle with respect to supply voltage to bear the required relationship with respect to that in winding 31. When the amplifier 24 receives a signal from the winding of rotor 38 indicating that it is not at the null position, the motor action is such that it tends to align the rotor by turning it to take up the zero induced voltage relationship. Motor 29 is reversible to run in the direction determined by lead or lag of the current in winding 31 with respect to current in the space quadrature winding, the latter being of fixed electrical phase, the sense of the angle $\alpha$ determining the sense of the corrective movement. A gear reducing train 58 couples the motor with the synchro rotor 38 and also to the positioning element of a resolver 49.

Referring additionally to FIGURE 6, a portion of the computing mechanism of block 42 is shown, including resolver 49 comprising a ball integrator mechanism, generally idealized and designated ball 59, having a rotatable friction drive element 62 fed from a drive mechanism 55 arranged to turn ball 59 about a diameter so that the peripheral motion along a great circle on its surface lying at right angles to such diameter is proportional to craft displacement relative to ground. In the case that the input delivered from measuring system 40 by way of leads 41 is a signal representing the numerical value of ground speed, block 55 will be understood to include the necessary elements for producing a shaft rotation as for example setting mechanism for radial position of a ball in a disc-ball-drum mechanical integrator having the disc driven by a constant speed motor. Where the craft ground speed is directly represented by a shaft turning rate proportional to ground speed, the drive member 62 is directly driven at a rate proportional thereto. Positioning system 49, operated by motor 29, controls the ball rotation so that orthogonally related friction output members 56 and 57, spaced 90 degrees apart from each other and from the drive 62, receive inputs proportional to the cosine and the sine functions of the angle $\alpha$. In order to produce a minimum load on the resolver the output shafts of friction members 56 and 57 are preferably coupled to drive rotary switching mechanism of low torque requirements, such as "M" transmitter devices 66 and 67. The outputs therefrom are each carried by three conductors connected to respective M-motors (not shown) of conventional type arranged to drive the along-track and offset distance registers 10 and 45.

Referring again to FIGURE 3, there is further provided with the apparatus, a warning device such as lamp 71, which lights whenever the quantity stored in an active register becomes less than ten miles. When for example the hundreds indicator 16 and the tens indicator 15 of register 10 come to zero, push rods 19 and 18 cause a path to be completed for current flowing through the warning lamp by way of parts 1Z10A, 1Z10—, 1R—, 1RN, 1S—, 1SN, 3Z10—, and 3Z10A to ground.

When it may be desired to employ manual switching between course registers, switches S10 and S11 must be opened, otherwise the system would stubbornly oppose a change contrary to its automatic transfer instructions, while current paths remain for energizing Z10 and Z10'.

By inspection of the transfer switching circuits, it will be apparent that should the quantity "0—0—0" be present on the indicators of register 11, and the register 10 has its stored quantity reduced toward zero, there will be no transfer action since at least 10 miles must remain on register 11 for a path to be completed from pole 1R'— to winding Z10. Conversely, zero storage on register 10 will prevent a change over when active register 11 runs down to zero.

I claim:

1. In navigational computing and indicating apparatus wherein information of ground speed and direction is provided as input data and wherein computation means produces therefrom a component distance quantity as output data, a first and a second totalising register each having an input shaft and having digit storage and display elements for units and higher orders of numbers representing magnitudes of said component, carry drive mechanism coupling each element with an element of next higher order, a cam projection carried by each element, a switch arm actuatable by each order element cam for movement between first and second contact positions whereby to disconnect said arm from said first contact and to connect said arm with said second contact when the element indicates zero storage, an electric drive motor drivably coupled with each register input, selector means for switching said computed output data to energize one of said drive motors, a first and a second electromagnetic transfer device, a moveable armature operable by energization of a transfer device to occupy a respective limit position and to actuate said selector means, a source of electrical current supply, first circuit means in each register connecting said supply source with the first contacts of switch arms of orders higher than the units order, second circuit means in said second register connecting one of said transfer devices in series with said first circuit means when the arm of an order element higher than the first order in said second register is connected with its associated first contact, third circuit means connecting said transfer device in series with a path including all the switch arms of the first register whereby when said path is made continuous over the switch arms and second contacts of said first register upon clearance of the said first register storage, said one of said transfer devices is energized from said source to transfer input of said computed output data to actuate said second register.

2. In combination with first and second like registers for storing numerical quantities, said registers comprising moveable digit storage elements for respective decade orders, a single pole double throw switch operable by each element to throw from a rest contact to an operated contact position when the element stores a zero number, a plurality of selector arms moveable between alternate positions and each arm having a single contact, a first and a second electromagnetic transfer device having first and second terminals and being energizable to actuate said selector arms respectively to said alternate positions, a source of electrical current supply, means connecting said supply source to the rest contacts of switches associated with elements for tens and higher orders, means connecting the pole of a tens order switch of a first register with a first selector arm and with a first terminal of a second transfer device, means connecting the pole of a tens order switch of a second register with a second selector arm and with a first terminal of a first transfer device, means connecting a third selector arm with the operated contact of the highest order switch of the first register, means connecting a fourth selector arm with the operated contact of the highest order switch of the second register, means connecting a reference potential to the contacts of said third and fourth arms, means interconnecting the operated contact of a switch with the pole of a next higher order device, means connecting a fifth and a sixth selector arm respectively with the poles of the lowest order switches and means connecting associated contacts of said fifth and sixth arms respectively with the second terminals of said first and second transfer devices, whereby when the first register is cleared to zero a current path is completed to energize said second transfer device from said source and to disconnect said first, third, and fifth arms from their associated contacts and to make connection of said second, fourth, and sixth arms with their respective contacts.

3. Apparatus as in claim 1 wherein said selector means includes a plurality of single pole single throw switches and wherein said third circuit means comprises a pair of said switches and their associated contacts connected in series with said path whereby movement of said armature upon energization of said one of said transfer devices disconnects said pair of switches to open said path and to de-energize said one of said transfer devices upon effecting a transfer.

4. Apparatus as in claim 1 further including register means for accumulating offset distance component of ground speed and wherein said first and second registers are driven in such sense as to diminish the numerical magnitude of a stored quantity representing track distance indicated to a destination when the direction of motion is toward said destination.

5. Apparatus as in claim 3 wherein a further switch is included in series between said path and a warning indicator connected with said source, whereby when said first register stores less than a predetermined quantity greater than unity said warning indicator is energized.

6. The combination of claim 2 including a source of electric signal representing numerical input to a register and electrical drive means responsive to said signal for adding and subtracting numerical quantities, and further selector arms actuatable by said transfer device to disconnect said input from the drive means for said first register when the first register is cleared to zero and to apply said input to the second register.

7. The combination of claim 6 further comprising a ground track component distance computer for computing along-track and offset distance components of ground speed of a craft, a pair of further registering means for storing inserted bearing angles of consecutive courses to be followed, said first and second registers including means for inserting respective track distances of said courses, and means applying electrical quantities representing the respective bearing angle of a selected course to said computer including further selector arms actuatable by said transfer devices.

References Cited in the file of this patent

UNITED STATES PATENTS

| | | |
|---|---|---|
| 2,233,490 | Shields | Mar. 4, 1941 |
| 2,544,894 | Nelson | Mar. 13, 1951 |
| 2,574,283 | Potter | Nov. 6, 1951 |
| 2,633,401 | Mitchell | Mar. 31, 1953 |
| 2,749,041 | Gersch | June 5, 1956 |
| 2,803,407 | Berger | Aug. 20, 1957 |

OTHER REFERENCES

Bath, C. C.: "Applications of Doppler Radar to the Navigation Problem," Doppler Radar Technical Papers, The Sixth Annual IRE East Coast Conference on Aeronautical and Navigational Electronics, Bendix Radio Division, Baltimore, Md., pp. 10.2–1 to 10.2–5 (October 1959).